United States Patent
Toomey (10) Patent No.: US 9,390,422 B2
(45) Date of Patent: Jul. 12, 2016

(54) SYSTEM, METHOD AND COMPUTER PROGRAM PRODUCTS FOR CREATING AND MAINTAINING A CONSOLIDATED JOBS DATABASE

(75) Inventor: Paul Toomey, Palm Harbor, FL (US)

(73) Assignee: Geographic Solutions, Inc., Palm Harbor, FL (US)

( * ) Notice: Subject to any disclaimer, the term of this patent is extended or adjusted under 35 U.S.C. 154(b) by 467 days.

(21) Appl. No.: 11/393,394

(22) Filed: Mar. 30, 2006

(65) Prior Publication Data

US 2007/0239777 A1   Oct. 11, 2007

(51) Int. Cl.
*G06F 17/30* (2006.01)
*G06Q 30/02* (2012.01)

(52) U.S. Cl.
CPC .......... *G06Q 30/02* (2013.01); *G06F 17/30867* (2013.01)

(58) Field of Classification Search
None
See application file for complete search history.

(56) References Cited

U.S. PATENT DOCUMENTS

| | | | |
|---|---|---|---|
| 5,978,768 A * | 11/1999 | McGovern et al. | 705/1 |
| 6,370,510 B1 | 4/2002 | McGovern et al. | |
| 6,381,592 B1 | 4/2002 | Reuning | |
| 6,385,620 B1 | 5/2002 | Kurzius et al. | |
| 6,701,313 B1 * | 3/2004 | Smith | |
| 7,505,919 B2 * | 3/2009 | Richardson | 705/7.14 |
| 8,504,559 B1 * | 8/2013 | Elman et al. | 707/722 |
| 2002/0038299 A1 * | 3/2002 | Zernik et al. | 707/3 |
| 2002/0072946 A1 * | 6/2002 | Richardson | 705/8 |
| 2002/0073160 A1 * | 6/2002 | Purcell | 709/206 |
| 2003/0046311 A1 * | 3/2003 | Baidya et al. | 707/200 |
| 2003/0204439 A1 * | 10/2003 | Cullen, III | 705/11 |
| 2004/0107112 A1 * | 6/2004 | Cotter | 705/1 |
| 2006/0041532 A1 * | 2/2006 | Nikolov | 707/3 |
| 2006/0155636 A1 * | 7/2006 | Hermann et al. | 705/37 |
| 2006/0206448 A1 * | 9/2006 | Hyder et al. | 707/1 |

FOREIGN PATENT DOCUMENTS

WO    WO 0210956 A2 *    2/2002

* cited by examiner

*Primary Examiner* — Bai D. Vu
(74) *Attorney, Agent, or Firm* — Raubvogel Law Office (57) ABSTRACT

Systems, methods and computer program products include job bots that are configured to periodically visit network sites that have stored therein one or more job postings. During each visit, the one or more job postings are analyzed and a searchable job post database is updated to add new job postings, modify changed job postings and delete any removed job postings. A search engine is provided for job seekers to search the searchable job post database where a consolidate list of job postings from the network sites is stored.

26 Claims, 7 Drawing Sheets

Florida - Tampa ———— 72

Job Title: Consultant, Technical ◄——— 73
Requisition Number: 00073-044444 ◄——— 74

RESPONSIBILITIES:

This position is responsible for research and development of advanced technologies in support of the Liberty Agents Program.

SPECIFIC RESPONSIBILITIES:

Provide technical knowledge in the area of machine learning. Conduct research to assess emerging computational intelligence technologies. Design and construct technology prototypes using advanced technologies. Conduct demos and field trials.

EDUCATIONAL REQUIREMENTS:

MS Degree with experience in computer science or a related discipline.

CANDIDATE PROFILE:

Candidate must be able to support the assessment of emerging machine learning technologies. Candidate must possess working practical knowledge of computational intelligence algorithms. Practical knowledge of and exposure to state-of-the-art development languages and platforms including Java, C++ and/or LISP is desirable. The candidate will participate as member of a fast-paced multi-discipline team. The candidate should be a highly motivated with a passion for computational intelligence technologies and should have excellent oral and written communications skills.

78

Click here to submit resume. If you do not have a current resume, click here to submit a career profile.

SYSTEM, METHOD AND COMPUTER PROGRAM PRODUCTS FOR CREATING AND MAINTAINING A CONSOLIDATED JOBS DATABASE

BACKGROUND OF THE INVENTION

1. Field of the Invention

This invention relates to the field of job spidering and more particularly to a system, method and apparatus for finding job postings on a wide area network and importing the job postings into a common searchable format.

2. Description of the Related Art

Finding a job has progressed from word-of-mouth to newspaper want-ads to modern online services. The likes of Hotjobs.com and CareerBuilder.com have web sites containing millions of job postings. Furthermore, profession-specific sites such as careers.findlaw.com, jtpos.com have many more job postings specific to a particular industry or profession such as law. Even more geographically restricted sites such as orlandosentinel.com, Miami.com and latimes.com have job postings restricted to a certain geographic area (Orlando or Miami, Fla. and Los Angeles, Calif.). Add to that a plethora of corporate web sites such as att.com/hr (AT&T), dell.jobs.com (Dell) and 3m.com/careers (3M).

Each web site has its own database of job postings, its own search engine to help the jobseeker find the job they are looking for, its own format for displaying results and its own method/format for importing a résumé from the jobseeker. Furthermore, many of these web sites require the jobseeker have an account along with a username and password. In general, tens-of-thousands of new jobs are added, expired or modified every week; requiring the jobseeker to periodically log onto all potential job posting web site (remembering their logon credentials) and searching for their desired job using the tools specific to that web site.

What is needed is a system that will spider through this plethora of web sites, locate the job postings, extract pertinent information from each posting and import the information into a consolidated, searchable database whereby the jobseeker searches one database to find all applicable job postings then, when they find one of interest, they are able to apply to that job through the original web site (e.g., dell.jobs.com).

SUMMARY OF THE INVENTION

The present invention employs a unique method of visiting network (World Wide Web) sites (hosting sites) having active job posts. During the visit, the information is extracted from each job post on that network site, converted to a common schema (if needed) and stored in a searchable job postings database. The searchable job postings database provides a superset of all job postings found on all of the spidered sites, perhaps restricted geographically (e.g., to a particular state). Alternately, the superset can be later sub-divided based on geography. Therefore, the superset can be searched to find any job posting from any of the spidered job post hosting sites. A job seeker searches the searchable database to find job postings relevant to their needs and when found, the present invention provides a link back to the hosting site for the job seeker to apply for the job post.

In one embodiment, a method for creating and updating a consolidated database of job postings is disclosed including identifying a set of job post hosting sites having job postings therein then for each site within the set of job post hosting sites creating a job bot adapted to visit each site and extract job post information from the job postings stored at the site and store the extracted job post information in a searchable job posting database. The job bots are then run to visit each site and extract the job post information into the searchable job posting database. Afterwards, the job bots are run periodically to update the searchable job posting database.

In another embodiment, a system for creating and updating job posts in a consolidated database of job postings is disclosed including a computer connected to a network and a storage device operationally adapted to the computer with a searchable job posting database stored therein. There is a plurality of job bots, each adapted to visit an assigned job post hosting site through the network, extract job post information and update the searchable job posting database with the job post information. A dispatcher runs on the computer and periodically runs the plurality of job bots.

In another embodiment, a computer readable medium including computer programming instructions that cause a computer to perform the method for creating and updating a consolidated database of job postings is disclosed including identifying a set of job post hosting sites having job postings therein and for each site within the set of job post hosting sites creating a job bot adapted to visit each site and extract job post information for at least one of the job postings stored at each site and store the job post information in a searchable job posting database. The job bot is run to visit each site and extract the job post information into the searchable job posting database. Once the job bots are operational, the job bots are periodically run to update the searchable job posting database.

In another embodiment, a computer program product for use with a computer system for creating and updating a consolidated database of job postings is disclosed including a computer usable medium having computer-readable code embodied in the medium. The computer-readable code includes a plurality of instructions for extracting job posting information from a respective job post host site and updating a searchable job post database with the job postings information.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Reference will now be made in detail to the presently preferred embodiments of the invention, examples of which are illustrated in the accompanying drawings. Throughout the following detailed description, the same reference numerals refer to the same elements in all figures. Throughout the description, the term job post refers to any type of electronic advertisement for an open position, e.g., a job. The term job post hosting site refers to any electronic site accessible by the system of the present invention and having at least one job post stored therein. The term searchable job posting database refers to an internal database of the present invention for storing job post information or data extracted from one or more job hosting sites. The searchable job posting database has a schema defining the structure and relationship of its contents, but the exact schema can vary without veering from the inventive parts of the present invention. Furthermore, the searchable job posting database can be managed by any database manager including, for example, Oracle and Access, without veering from the inventive parts of the present invention. The term job spider refers to a program that automatically extracts data related to job postings from the job postings on job post hosting sites. A job bot refers to software that performs the job spidering and runs automatically without human intelligence. The job bot may or may not include a form of artificial intelligence so that it can react to variations and changes at the job hosting site.

Figure 1:
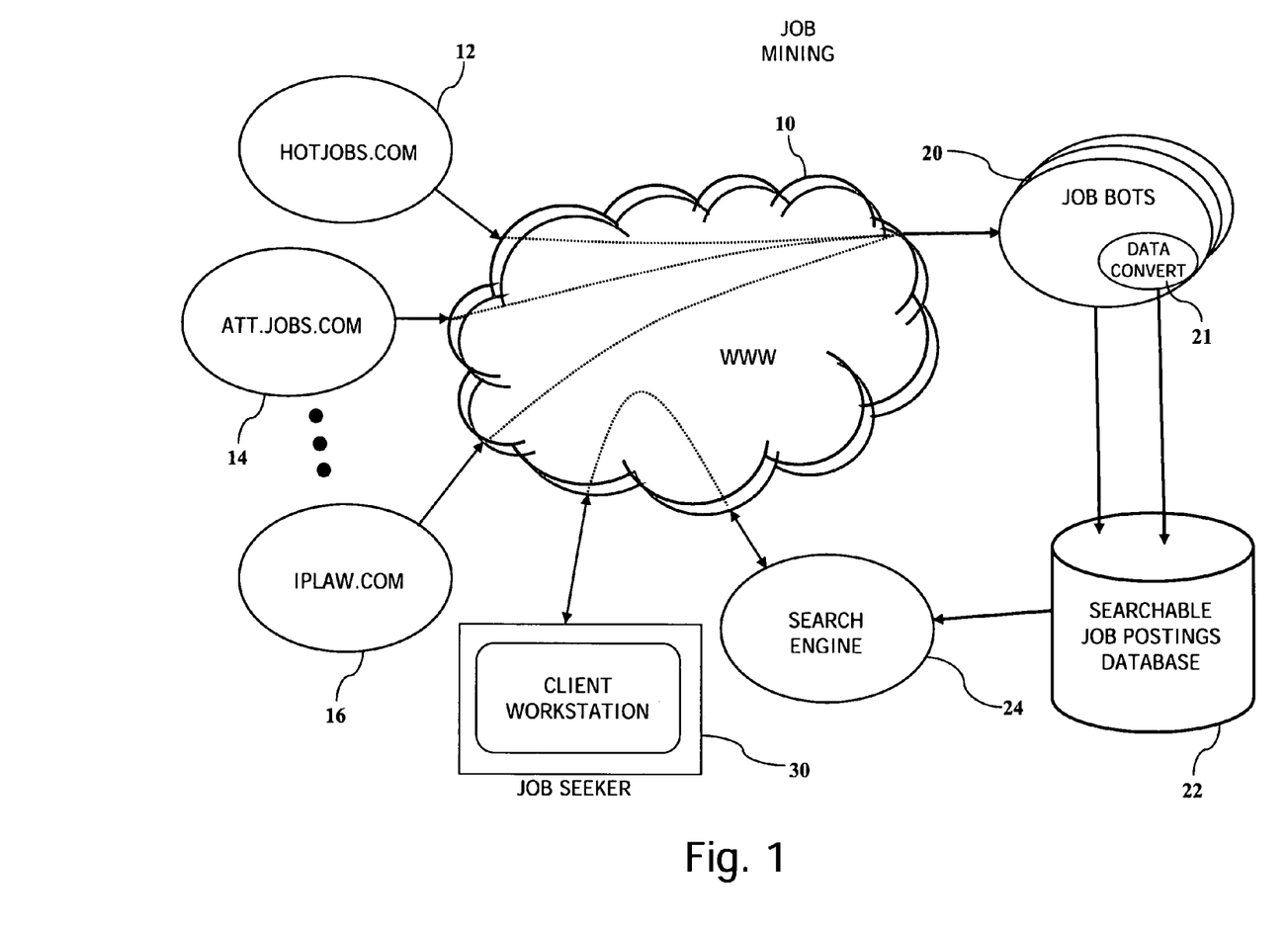
FIG. 1 illustrates an example system for spidering job postings according to one embodiment of the present invention.

Referring now to FIG. 1, an exemplary system for spidering job postings according to one embodiment of the present invention is shown. The present invention includes job bots 20 that periodically visit job post hosting sites 12/14/16 to extract job post information. The job hosting sites 12/14/16 are, for example, for-fee job posting web sites such as hotjobs.com 12; private corporate job posting web sites such as AT&T Corporations att.jobs.com 14 and for-fee job posting web sites having a narrow set of types of jobs such as iplaw.com 16, having jobs related to the field of law. Other types of sites include the US and foreign governments and college web sites. The present invention is not limited to the type of hosting site. A list of the target sites is created by a person searching the network for job postings.

For each particular hosting site 12/14/16, there is a corresponding job bot 20 designed to find job postings, parse information from the job postings and store the parsed information in the searchable job postings database 22. For much of the information found on the job postings, the data is copied directly into a record of the searchable job posting database 22. For example, the schema of the searchable job postings database 22 has a field for contact last name and the hosting site also has a field for contact last name, then that field is copied directly into the searchable record for that job posting. Alternately, if the job posting has a field for contact name (last, first) and the searchable job postings database 22 has a field for contact last name, then the field is passed through a conversion 21 that, in this example, copies all characters from the job post field for contact name up until the comma into the searchable job postings database 22 field for contact last name. The Searchable Job Post Fields in Table-1 below is an exemplary list of fields that are mined from the job posting into the searchable job postings database 22:

TABLE 1

Searchable Job Post Fields

| FIELD NAME | DESCRIPTION |
| --- | --- |
| Jobid | The job ID that is posted on the website. |
| JobWebsiteID | This is the job ID that the website, used to internally track the record. |

TABLE 1-continued

Searchable Job Post Fields

| FIELD NAME | DESCRIPTION |
| --- | --- |
| jobtitle | The title of the job. |
| jobtype | Type of job. For example: full-time, part-time, and per-diem. |
| openings | Number of jobs of this type that are available. |
| postdate | The date the job was posted on the host site. |
| closedate | Last date to apply for the job. |
| startdate | When the job will be starting. This is rarely listed. |
| jobdesc | Description of the job. |
| education | Educational requirements of the job. |
| experience | The experience requirements of the job. |
| additionalinfo | Anything else that is relevant to the job that does not appear in another field. |
| shiftdesc | Information about the type of shift. For example: nights, days, weekends, 8-5 pm, etc. |
| hours | Number of work hours per week. |
| benefits | Description of what benefits are included with the job and are specific for that job. |
| benefitsURL | A link to the benefits page, if one exists. |
| url | A link to the job details page. That is job specific. |
| applybyurl | A link to a page where the jobseeker can go to apply for the job. |
| salarystring | What the job pays, or a sentence describing the pay scale. |
| salary | The numerical amount of the pay. If a range is given, use this minimum pay. |
| maxsalary | The maximum salary that is available |
| salaryunit | Code used to describe pay frequency i.e. 1: hourly, 2: daily, 3: weekly, 4: monthly, 5: annually |
| employer | The employer's name. |
| contact | The name of the person or department to contact about the job. |
| phone | Phone number |
| fax | Fax number |
| email | Email address |
| address1 | The street address where the job is located |
| city | The city where the job is located. |
| state | The state where the job is located. |
| country | The country where the job is located. |

Once searchable job posting records are available in the searchable job postings database 22, a job seeker at a client workstation 30 connects to the search engine 24 of the present invention through a network, for example the World Wide Web 10. There, the job seeker can search for job postings from many different job post hosting sites 12/14/16 by searching the searchable job postings database 22. Once a job of interest is found (e.g., a record of the searchable job posting database 22 is identified), the job seeker can link back to the job hosting site 12/14/16 and apply for the job in the same manner as if they found the job on that particular job hosting site 12/14/16. Applying for the job can be done through the "url" field or the "applybyurl" field of the searchable job post fields within the record found. Alternately, the present invention can include tools allowing the job seeker to register their résumé and when a job posting is found, export their résumé back to the job post hosting web site 12/14/16 containing the identified job post.

Figure 2:
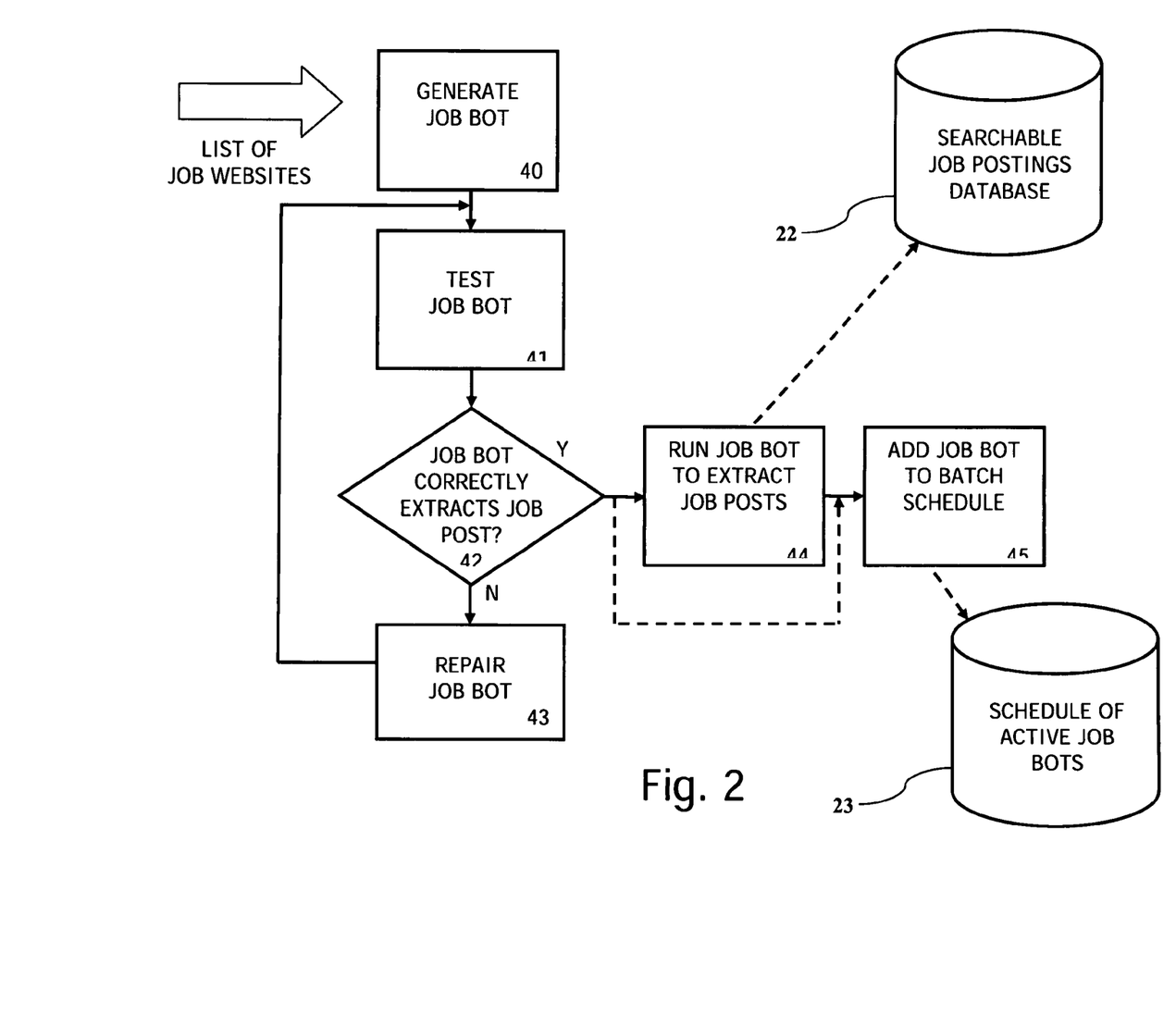
FIG. 2 illustrates an example method of adding a jobsite to be spidered according to one embodiment of the present invention.

Referring now to FIG. 2, an example method of adding a jobsite to be spidered according to one embodiment of the present invention is shown. A list of job post hosting websites having job postings is compiled. This is done by a person searching for websites and looking for at least one job posting and then putting the address (URL) of that job post hosting sites into a list of job websites. Next, one or more programmers generate a job bot 40 for one of the job post hosting sites in the list. The programmer uses the location of the job postings within the job post hosting sites and a template of a job posting from that site to create a job bot 40 for that particular job post hosting sites. The job bot 20 can be written in any programming language, preferably using a scripting language. Once created, the job bot 20 is tested 41 by running it against the target job post hosting sites and if it doesn't find the job postings on that site or generates erroneous outputs 42, it is repaired 43 and the previous two steps are repeated until the job bot 20 operates correctly. Once running correctly, the job bot 20 is optionally run 44 to extract the job posts from that site and add them to the searchable job postings database 22 and the job bot 20 is added to the job bot batch schedule (schedule of active job bots 23) 40 so it is scheduled to run on a regular basis to extract any new job postings or changed postings from that job posting web site.

Figure 3:
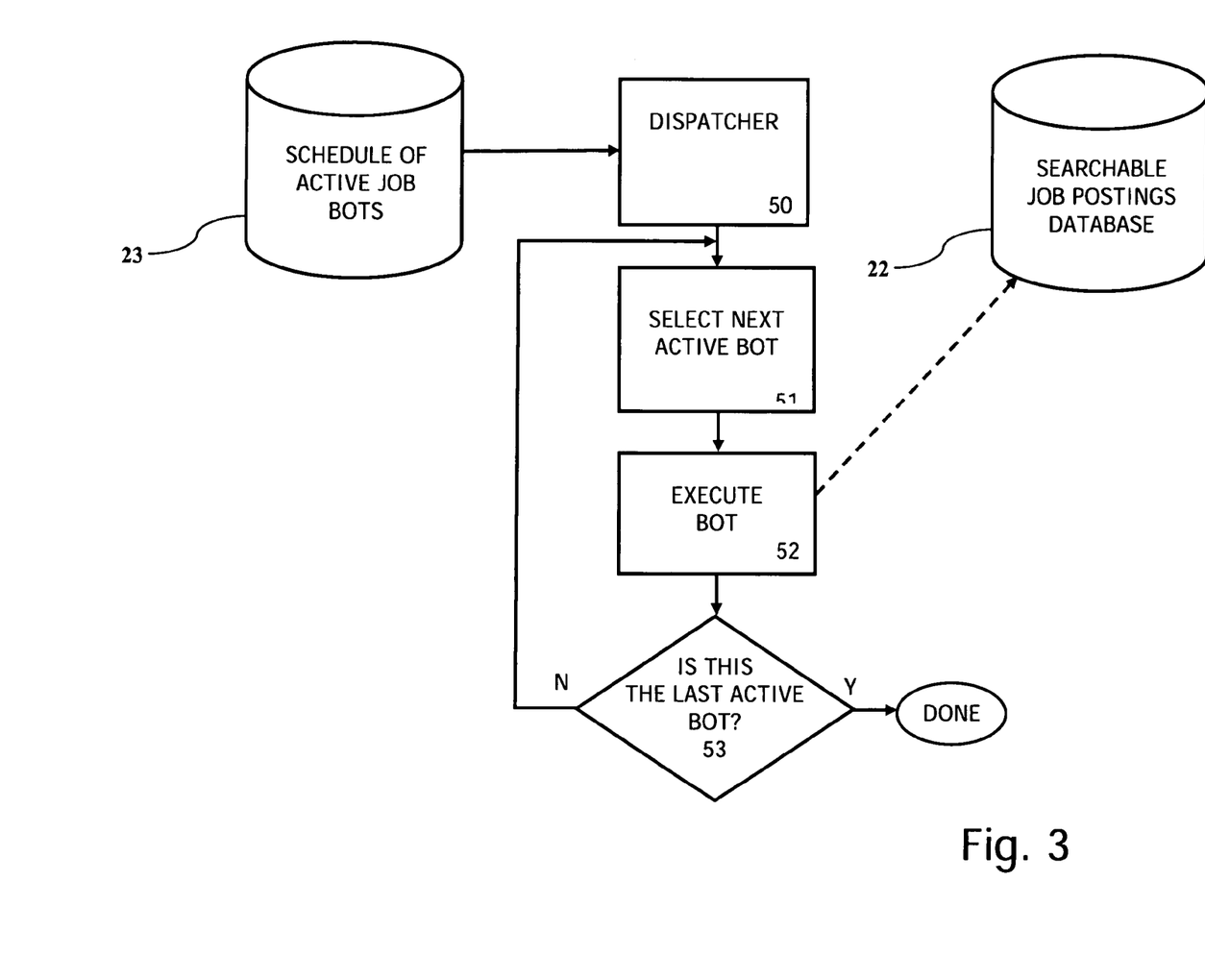
FIG. 3 illustrates an example method of periodically spidering according to one embodiment of the present invention.

Referring now to FIG. 3, an example method of periodically spidering according to one embodiment of the present invention is shown. The schedule of active job bots 23 created by the previous step (see FIG. 2) is coupled to a dispatcher 40. The dispatcher periodically goes through the schedule of active job bots 23 and executes one or more job bots 20 in order to update the searchable job postings database 22. In the preferred embodiment, the dispatcher 40 wakes up during the evening and runs all available job bots 20. Alternately, the dispatcher 40 can wake up at any time based upon the selection of an administrator. In some embodiments, the job bots 20 are executed sequentially while in other embodiments, several job bots 20 are executed concurrently. In some embodiments, several job bots 20 run on a single server while in other embodiments, there are multiple servers and one or more job bots 20 are run concurrently on each of the servers.

There are many ways known in computer operating systems to schedule a dispatcher 40 including the UNIX cron(1) table, and any method works well in the present invention. When the dispatcher 40 runs, it selects all or a subset of the active job bots from the schedule of active job bots 23, selecting the next one from a list 51 and executing it 52, whereby the job bot 20 updates the searchable job postings database 22 with any new, changed or deleted job postings from the job hosting web site associated with that job bot 20. If there are more active job bots in the list 53, the previous two steps are repeated until none are left. When the job bot 20 is executed, it spiders its respective job post hosting site and updates the searchable job posting database 22 with any changes to existing job posts or the addition of any new job posts. If a previously extracted posting is no longer present on that job posting web site (12/14/16) for a period of time, preferably for a week, it is removed from the searchable job postings database 22. This time period allows the job post to remain in the searchable job posting database 22 even if it cannot be found at the job post hosting site so it doesn't get deleted because the job post hosting site is unavailable for maintenance, etc.

Figure 4:
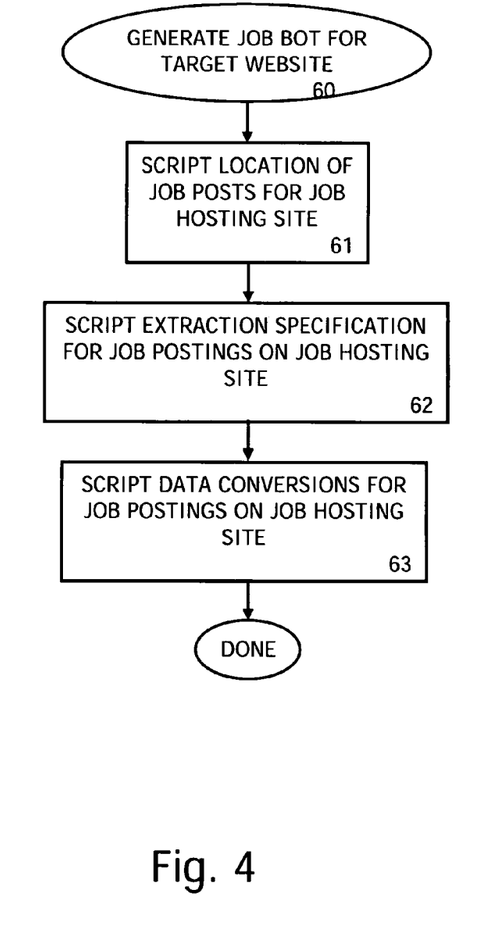
FIG. 4 illustrates an example method of creating a spidering job bot according to one embodiment of the present invention.

Referring to FIG. 4, an example method of creating a spidering job bot according to one embodiment of the present invention is shown. The task of generating a job bot for a target job post hosting sites 60 includes (in any order) adding the location of the target job post hosting sites to the job bot 61, adding extraction specification scripts for the target web site 62 to the job bot and adding data conversion scripts for the target web site to the job bot 63. The location of the target job post hosting sites 61 can include the home page whereas the job bot is required to "walk" the home page to find active job posts or it can include one or more individual sub-pages, each containing one or more job posts. The extraction scripts include information leading to the location of each field within the job posts on the job post hosting sites and can be an absolute field location (e.g., row and column) or a field title string (e.g., "Name:") or any other means for finding a specific field. The spidering job bot can be written in any programming language, preferably a scripting language.

Figure 5:
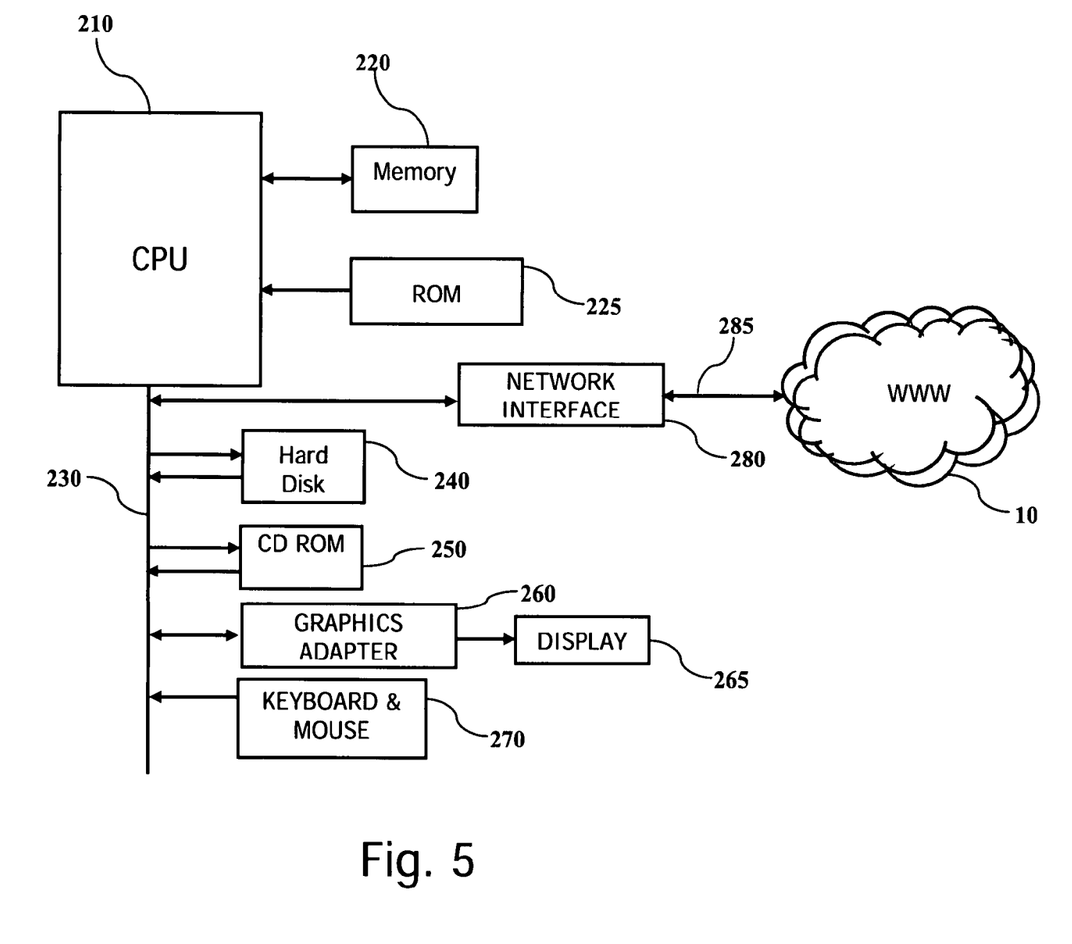
FIG. 5 illustrates an example computer system of all embodiments of the present invention.
Figure 5A:
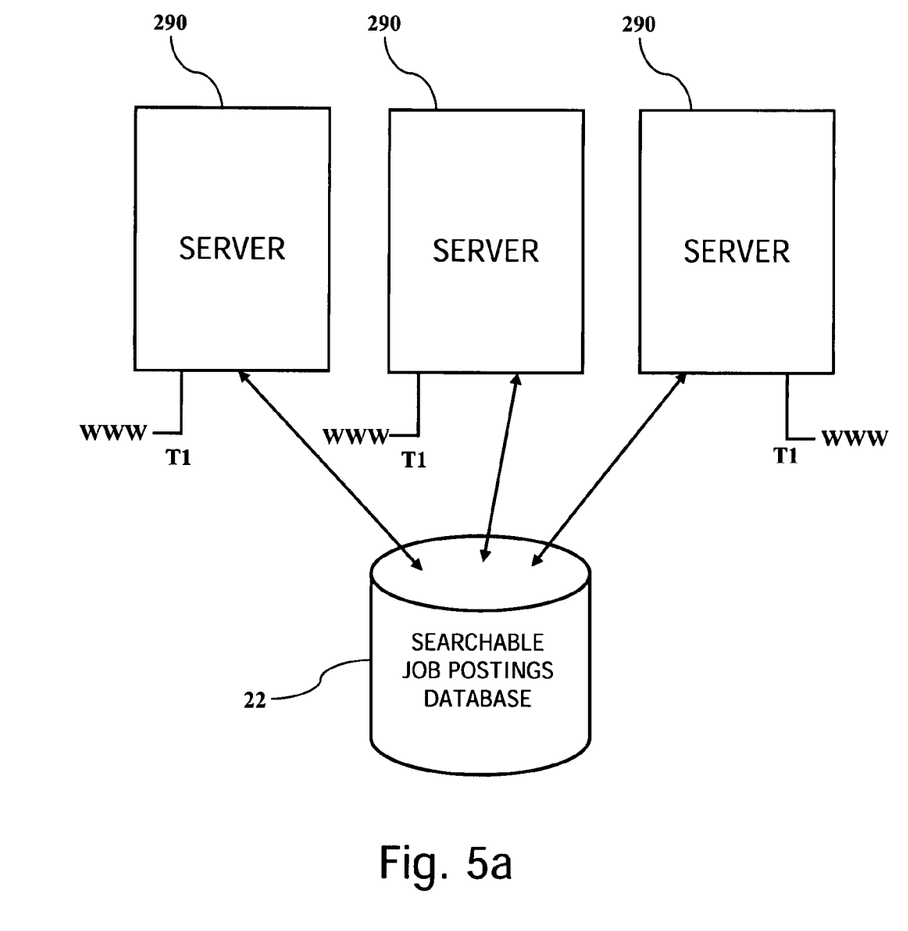
FIG. 5a illustrates a second example computer system of all embodiments of the present invention.

Referring to FIG. 5 and FIG. 5a, a schematic block diagram of an exemplary computer system of the present invention is shown. Although shown in its simplest form, having a single processor, many different computer architectures are known that accomplish similar results in a similar fashion and the present invention is not limited in any way to any particular computer system. The present invention works well utilizing a single processor system as shown in FIG. 5, a multiple processor system where multiple processors share resources such as memory and storage, a multiple server system (as in FIG. 5a) where several independent servers operate in parallel (perhaps having shared access to the searchable job posting database 22) or any combination. In this, a processor 210 is provided to execute stored programs that are generally stored for execution within a memory 220. The processor 210 can be any processor or a group of processors, for example an Intel Pentium-4® CPU or the like. The memory 220 is connected to the processor and can be any memory suitable for connection with the selected processor 210, such as SRAM, DRAM, SDRAM, RDRAM, DDR, DDR-2, etc. Firmware is stored in firmware storage 225 that is connected to the processor 210 and may include initialization software known as BIOS. This initialization software usually operates when power is applied to the system or when the system is reset. In some embodiments, the software is read and executed directly from the firmware storage 225. Alternately, the initialization software is copied into the memory 220 and executed from the memory 220 to improve performance.

Also connected to the processor 210 is a system bus 230 for connecting to peripheral subsystems such as a network interface 280, a hard disk 240, a CDROM 250, a graphics adapter 260 and a keyboard/mouse 270. The graphics adapter 260 receives commands and display information from the system bus 230 and generates a display image that is displayed on the display 265.

In general, the hard disk 240 may be used to store programs, executable code and data persistently, while the CDROM 250 may be used to load said programs, executable code and data from removable media onto the hard disk 240. These peripherals are meant to be examples of input/output devices, persistent storage and removable media storage. Other examples of persistent storage include core memory, FRAM, flash memory, etc. Other examples of removable media storage include CDRW, DVD, DVD writeable, compact flash, other removable flash media, floppy disk, ZIP®, laser disk, etc. In some embodiments, other devices are connected to the system through the system bus 230 or with other input-output connections. Examples of these devices include printers; mice; graphics tablets; joysticks; and communications adapters such as modems and Ethernet adapters.

The network interface 280 connects the computer-based system to the world-wide-web 10 through a link 285 which is, preferably, a high speed link such as a cable broadband connection, a Digital Subscriber Loop (DSL) broadband connection, a T1 line or a T3 line.

FIG. 5a shows a set of servers 290, each having access to the searchable job posting database 22. In this example, job bots 20 can be run in parallel on each server 290, accessing the job post hosting sites through, in this example, a serial T1 line operating at 1.44 Mbps providing access to the world-wide-web (www). Although T1 is shown, any broadband connection works equally as well including cable, DSL and T3.

Figure 6:
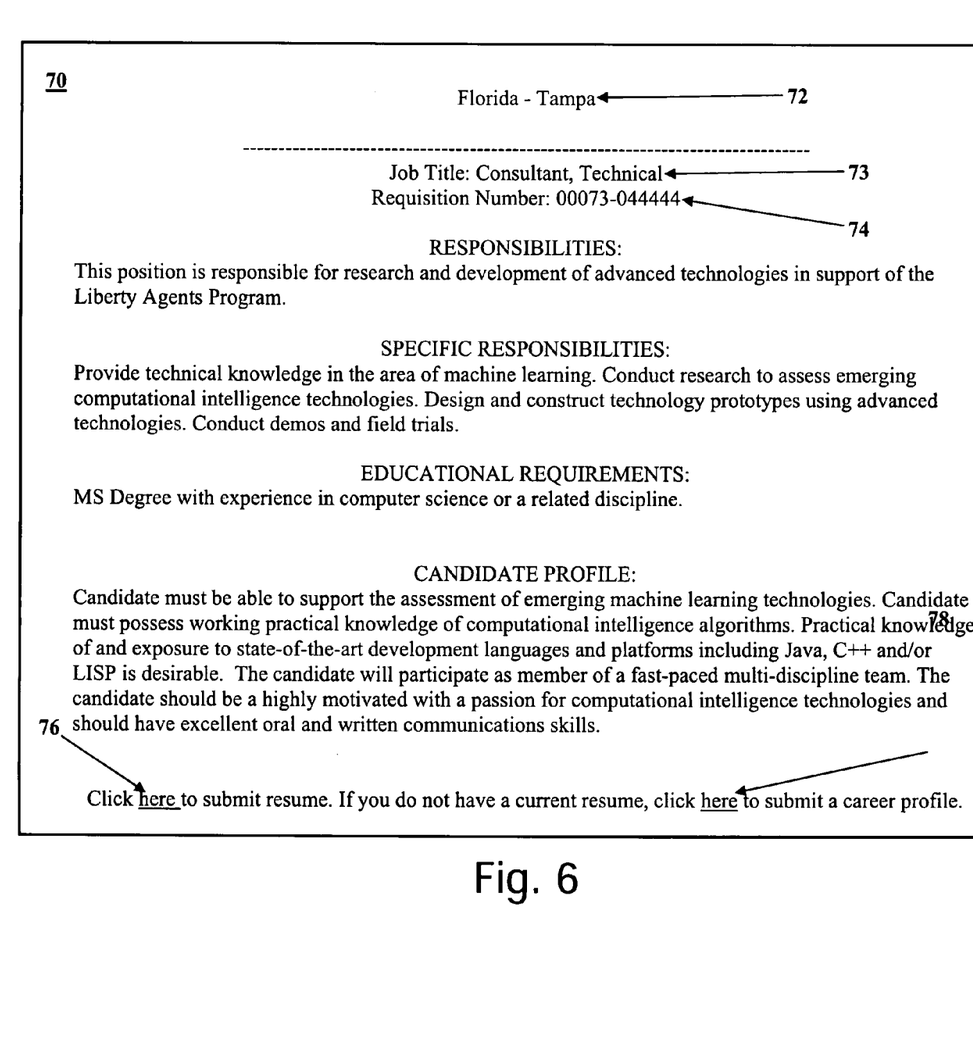
FIG. 6 illustrates an example of a job posting of all embodiments of the present invention.

Referring to FIG. 6, an example of a job posting 70 of all embodiments of the present invention is shown. In this job posting 70, there is a location of the job (Tampa, Fla.) 72, the job title (technical consultant) 73 and a job requisition number (00073-044444) 74. Following that is a description of the job, responsibilities, educational requirements and expectations of the candidate. On this particular job post, there are two links 76/78 for applying to the job, a first link 76 for a job seeker who already has a résumé and a second link 78 for a job seeker who doesn't have a résumé. In this example, the job bot is programmed with the following according to the Searchable Job Post Fields in Table-1:

1. city is centered at the top of the job posting following "-".
2. state is centered at the top of the job posting preceding "-".
3. jobtitle follows "Job Title:"
4. jobid follows ":Requisition Number:"
5. jobdesc follows "RESPONSIBILITIES:" and ends just before "EDUCATIONAL REQUIREMENTS" and the string "SPECIFIC RESPONSIBILITIES:" is suppressed.
6. education follows "EDUCATIONAL REQUIREMENTS:" and ends just before "CANDIDATE PROFILE:"
7. experience follows "CANDIDATE PROFILE:" and ends just before "Click here"
8. applybyurl is embedded within "click here to submit résumé.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A method for creating and updating a consolidated database of job postings, the method comprising the steps of:
    receiving user input to manually identify a set of job post hosting sites for data extraction, the job post hosting sites having job postings therein;
    for each site within the set of job post hosting sites manually identified for data extraction:
        receiving user input to manually program and test a job bot specific to a job listing format of the manually identified site, the job bot programmed to:
            visit said manually identified site;
            extract job post information for at least one of the job postings stored at said manually identified site; and
            store the job post information in a searchable job posting database; and
        running the job bot to visit said manually identified site and extract the job post information into the searchable job posting database;
    periodically running the job bots to update the searchable job posting database, updating the searchable job posting database with changes to previously extracted job post information, adding newly extracted job post information, and retaining previously extracted job post information that is no longer present on the job post hosting site for a predetermined period of time after the previously extracted job post information is determined to be no longer present on the job post hosting site;
    providing a plurality of searchable job post fields from the extracted job post information, the searchable job post fields allowing a jobseeker to search the job postings based on at least one of the plurality of searchable job post fields;
    providing a summary form to the jobseeker for one of the job postings from the extracted job post information, said summary form having a job title, a geographic location, and a list of general responsibilities; and
    providing a plurality of links within said summary form.

2. The method according to claim 1, further comprising providing a benefits link within the searchable job posting database to enable viewing of benefits of at least one of the job postings.

3. The method according to claim 1, further comprising providing a job detail link within the searchable job posting database to enable viewing of job details of at least one of the job postings.

4. The method according to claim 1, further comprising:
    receiving a resume from the job seeker; and
    exporting the received resume to at least one site of the job post hosting sites.

5. The method according to claim 1, wherein said summary form further comprises a list of educational requirements.

6. The method according to claim 1, wherein said summary form further comprises a candidate profile.

7. The method according to claim 1, wherein said summary form further comprises a list of specific responsibilities.

8. The method according to claim 1, wherein said summary form further comprises a requisition number.

9. The method according to claim 1, wherein a first link of the plurality of links within said summary form allows the jobseeker to apply to at least one of the job postings.

10. The method according to claim 9, wherein a second link of the plurality of links within said summary form allows the jobseeker to submit a resume to at least one of the job postings.

11. The method according to claim 10, wherein a third link of the plurality of links within said summary form allows the jobseeker to submit a career profile to the job post hosting site.

12. A system for creating and updating job posts in a consolidated database of job postings, the system comprising:
    a computer connected to a network;
    a storage device operationally interfaced to the computer;
    a searchable job posting database stored within the storage device;
    a plurality of job bots, each of the plurality of job bots independently and manually programmed by a human programmer to visit, via the network, a job post hosting site manually identified for data extraction, each of the plurality of job bots independently programmed by the programmer to extract job post information from the visited job post hosting site, and each of the plurality of job bots independently programmed by the programmer to update the searchable job posting database with the job post information, the plurality of job bots being further configured to perform the steps of:
        updating the searchable job posting database with changes to previously extracted job post information;
        adding newly extracted job post information; and
        retaining previously extracted job post information that is no longer present on the job post hosting site for a predetermined period of time after the previously extracted job post information is determined to be no longer present on the job post hosting site; and
    a dispatcher running on the computer, the dispatcher configured to periodically run the plurality of job bots;

wherein each job bot is customized for a job listing format of a particular job post hosting site;

wherein the system provides a plurality of searchable job post fields from extracted job post information, the searchable job post fields allowing a jobseeker to search the job postings based on at least one of the plurality of searchable job post fields;

wherein the system provides a summary form to the jobseeker for one of the job postings from the extracted job post information, said summary form having a job title, a geographic location, and a list of general responsibilities; and wherein the system provides a plurality of links within said summary form.

13. The system of claim 12, wherein the system provides a benefits link within the searchable job posting database.

14. The system of claim 12, wherein the system provides a job detail link within the searchable job posting database to enable viewing of job details of at least one of the job postings.

15. The system of claim 12, further comprising:
a search engine program running on the computer, the search engine program configured to connect with at least one client workstation through the network, the search engine program configured to accept search criteria from the at least one client workstation, the search engine program configured to search for stored job postings in the searchable job posting database that match the search criteria, and the search engine program configured to return to the client workstation a copy of matching job postings found in the searchable job posting database.

16. The system of claim 12, wherein the plurality of links comprises a first link that enables a jobseeker to apply to at least one of the job postings.

17. The system of claim 16, wherein the plurality of links comprises a second link that enables a jobseeker to submit a resume to at least one of the job postings.

18. A non-transitory computer-readable medium for creating and updating a consolidated database of job postings, comprising instructions stored thereon, that when executed by a processor, perform the steps of:
receiving user input to manually identify a set of job post hosting sites for data extraction, the job post hosting sites having job postings therein;
for each site within the list of job post hosting sites manually identified for data extraction:
receiving user input to manually program and test a job bot specific to a job listing format of the manually identified site, the job bot programmed to:
visit said manually identified site;
extract job post information for at least one of the job postings stored at said manually identified site; and
store the job post information in a searchable job posting database; and
running the job bot to visit said manually identified site and extract the job post information into the searchable job posting database;
periodically running the job bots to perform the steps of:
updating the searchable job posting database with changes to previously extracted job post information;
adding newly extracted job post information; and
retaining previously extracted job post information that is no longer present on the job post hosting site for a predetermined period of time after the previously extracted job post information is determined to be no longer present on the job post hosting site;

providing a plurality of searchable job post fields from the extracted job post information, the searchable job post fields allowing a jobseeker to search the job postings based on at least one of the plurality of searchable job post fields;

providing a summary form to the jobseeker for one of the job postings from the extracted job post information, said summary form having a job title, a geographic location, and a list of general responsibilities; and providing a plurality of links within said summary form.

19. The non-transitory computer-readable medium according to claim 18, further comprising instructions stored thereon, that when executed by a processor, perform the step of providing a benefits link within the searchable job posting database to enable viewing of benefits of at least one of the job postings.

20. The non-transitory computer-readable medium according to claim 18, further comprising instructions stored thereon, that when executed by a processor, perform the step of providing a job detail link within the searchable job posting database to enable viewing of job details of at least one of the job postings.

21. The non-transitory computer-readable medium according to claim 18, further comprising instructions stored thereon, that when executed by a processor, perform the steps of:
receiving a resume from the job seeker; and
exporting the received resume to at least one site of the job post hosting sites.

22. The non-transitory computer-readable medium of claim 18, wherein the plurality of links comprises a first link that enables a jobseeker to apply to at least one of the job postings.

23. The non-transitory computer-readable medium of claim 22, wherein the plurality of links comprises a second link that enables a jobseeker to submit a resume to at least one of the job postings.

24. A computer program product used with a computer system in creating and updating a consolidated database of job postings from a plurality of identified job post hosting sites, the computer program product comprising a non-transitory computer-readable medium comprising instructions stored thereon, that when executed by a processor, perform the steps of:
running a plurality of job bots, each job bot comprising instructions for:
extracting job posting information from a respective job post hosting site of the plurality of identified job post hosting sites; and
updating a searchable job post database with the job postings information;
wherein each job bot is independently and manually programmed by a human programmer and customized for a job listing format of one of the plurality of job post hosting sites manually identified for data extraction;
periodically running the plurality of job bots to perform the steps of:
updating the searchable job posting database with changes to previously extracted job post information;
adding newly extracted job post information; and
retaining previously extracted job post information that is no longer present on the job post hosting site for a predetermined period of time after the previously extracted job post information is determined to be no longer present on the job post hosting site;

providing a plurality of searchable job post fields from the extracted job post information, the searchable job post fields allowing a jobseeker to search the job postings based on at least one of the plurality of searchable job post fields;

providing a summary form to the jobseeker for one of the job postings from the extracted job post information, said summary form having a job title, a geographic location, and a list of general responsibilities; and providing a plurality of links within said summary form.

25. The non-transitory computer-readable medium of claim 24, wherein the plurality of links comprises a first link that enables a jobseeker to apply to at least one of the job postings.

26. The non-transitory computer-readable medium of claim 25, wherein the plurality of links comprises a second link that enables a jobseeker to submit a resume to at least one of the job postings.

* * * * *